United States Patent
Wong

(10) Patent No.: US 7,203,671 B1
(45) Date of Patent: Apr. 10, 2007

(54) SYSTEM AND METHOD FOR VALIDATING THE TECHNICAL CORRECTNESS OF AN OLAP REPORTING PROJECT

(75) Inventor: Craig S. Wong, Herndon, VA (US)

(73) Assignee: Federal Home Loan Mortgage Corporation, McLean, VA (US)

( * ) Notice: Subject to any disclaimer, the term of this patent is extended or adjusted under 35 U.S.C. 154(b) by 470 days.

(21) Appl. No.: 10/770,536

(22) Filed: Feb. 4, 2004

Related U.S. Application Data

(60) Provisional application No. 60/446,203, filed on Feb. 11, 2003.

(51) Int. Cl.
*G06F 7/00* (2006.01)
*G06F 17/30* (2006.01)

(52) U.S. Cl. ............................................. 707/2; 707/3
(58) Field of Classification Search .................... 707/2, 707/3, 4, 5, 6, 10
See application file for complete search history.

(56) References Cited

U.S. PATENT DOCUMENTS

| | | | |
|---|---|---|---|
| 6,571,232 B1 * | 5/2003 | Goldberg et al. | 707/2 |
| 6,768,986 B2 * | 7/2004 | Cras et al. | 707/2 |
| 2004/0103092 A1 * | 5/2004 | Tuzhilin et al. | 707/3 |

OTHER PUBLICATIONS

Bateman, "Where are the Articles on Data Warehouse Testing and Validation Strategy?", DM Review, Oct. 2002, pp. 1-5.
Germain, Jack, "Virus Outbreak Filters New Tool to Block Infections," TechNewsWorld, Oct. 9, 2004.
Gonzales et al., "The OLAP-Aware Database," DB2 Magazine, 2003.

* cited by examiner

*Primary Examiner*—Sam Rimell
*Assistant Examiner*—Jacob F. Betit
(74) *Attorney, Agent, or Firm*—Finnegan, Henderson, Farabow, Garrett & Dunner, L.L.P.

(57) ABSTRACT

A system, method and computer program product for validating the technical correctness of an On-Line Analytical Processing (OLAP) reporting project is provided such that the likelihood of errors is systematically reduced. The method and computer program product is a proactive, repeatable methodology to prove or disprove the "correctness" of any OLAP reporting project. The present invention helps assure the correctness of the OLAP reporting project by reducing the likelihood that major design and data components within the OLAP application environment are not synchronized. That is, the present invention identifies discrepancies among the OLAP tool, the OLAP project schema, the data warehouse metadata and the data warehouse data, thus identifying potential errors which could occur as a result of those discrepancies.

10 Claims, 11 Drawing Sheets

SYSTEM AND METHOD FOR VALIDATING THE TECHNICAL CORRECTNESS OF AN OLAP REPORTING PROJECT

This application claims priority from U.S. Provisional Application No. 60/446,203, filed Feb. 11, 2003. The entirety of that provisional application is incorporated herein by reference.

BACKGROUND OF THE INVENTION

1. Field of the Invention

The present invention generally relates to On-Line Analytical Processing (OLAP) computer applications, and more particularly to validating the technical correctness of reporting projects created using such applications.

2. Related Art

In today's advanced technological climate, large enterprises (i.e., educational organizations, institutions, governmental agencies, corporations, other businesses and the like) often employ computer database systems for storing, retrieving and managing large amounts of data generated from, and used during, day-to-day operations (i.e., data warehouses). The data in these data warehouses are then used by the enterprises, for example, to generate reports on which enterprise performance is evaluated and business decisions are based. Consequently, the practice of validating data warehouses is an important discipline. Yet, the available literature addressing testing and validation strategies for data warehouse reporting—an important area within data warehousing—is limited. Rather, the majority of the literature in this field relates to building data warehouses.

OLAP tools are a category of database software which provides an interface to such data warehouses so that users can transform and filter raw data according to user-defined or pre-defined functions, and quickly and interactively examine the results in various dimensions of the data. That is, OLAP databases are capable of being queried by OLAP tools. Thus, OLAP tools primarily aggregate large amounts of diverse data, which can involve millions of data items with complex relationships, and analyze these relationships in order to identify patterns, trends and exceptions. One of the more widely-used OLAP tools is the MicroStrategy 7i OLAP reporting suite, available from MicroStrategy, Inc. of McLean, Va.

So important are OLAP tools to the success of an enterprise's operations, the OLAP Council, a Boston-based non-profit consortium of industry leaders in the OLAP market was established in January 1995. Its mission is to provide education about OLAP technology for business intelligence applications and to help position OLAP within a broader IT architecture. The OLAP Council also focuses on establishing guidelines for OLAP interoperability and data navigation.

OLAP tools generally employ a Structured Query Language (SQL) generation engine. The SQL generation engine reads a project-specific database called the "project schema." Within the project schema, all relevant aspects of the project's database environment are defined. A typical OLAP (e.g., MicroStrategy 7i) reporting project can offer hundreds or thousands of dynamic report combinations, and the project schema must be correctly defined to support all of the offered report combinations. Schema designers, however, can inadvertently introduce errors into the project schema. The OLAP tool's SQL generation engine can then read the erroneous schema and produce unexpected SQL, and then the subsequent reporting results can be unexpected and possibly erroneous.

For example, one of the primary capabilities of OLAP tools is the ability for a reporting analyst to modify reports dynamically (e.g., by adding or removing header or data values). This capability allows an analyst to make last minute decisions about what data is most interesting to examine. The reporting analyst would typically run one report, then run another report pertaining to a subset or superset of the data in the original report. Both reports would then be visible and available for a side-by-side comparison. The analyst would expect, of course, that header and data values flow smoothly from the first report to the second (i.e., that the values would not change unexpectedly).

Yet, it has been observed that displayed values can change merely because the reporting analyst modifies a report dynamically (e.g., by simply "dragging on" or "dragging off" a reporting attribute or metric on the OLAP tool's graphical user interface). Visible, unexpected changes of header or data values would certainly be undesirable. The changes in report results would be confusing. It is likely that the visible changes would diminish management's confidence in the quality and usability of the OLAP tool's reporting capability. Even worse, invisible changes or errors (i.e., those embedded and undetected in a report) are known to occur. Such invisible errors can be hazardous to an enterprise. In sum, observed errors include, but are not limited to, erroneous data total changes due to adding (dragging on) a new attribute in a report; erroneous header value changes due to the removal of a metric; and erroneous header value changes due to the addition of a metric.

In general, SQL generation engines are powerful and complex technologies that deserve to be studied systematically, with the study results cataloged for the purpose of system error elimination. Furthermore, the boundaries between the SQL generation engine and peer components (such as the project schema, the data warehouse metadata and the data warehouse data itself) should be examined for vulnerable areas.

The prior art has no consistent, repeatable methodology for verifying the correctness of an OLAP reporting project. Further, it is common to witness repeated occurrences of data quality errors during the generation of OLAP reporting projects. Those charged with debugging those errors often wonder if there might be a way to be proactive (i.e., proactively to prove or disprove the technical "correctness" of any OLAP reporting project).

Given the foregoing, what is needed is a system, method and computer program product for validating the technical correctness of an OLAP reporting project.

SUMMARY OF THE INVENTION

The present invention meets the above-identified needs by providing a system, method and computer program product for validating the technical correctness of an OLAP reporting project such that the likelihood of errors is systematically reduced.

In an embodiment, the present invention provides an application designed and coded in modules, deployed according to the client-server paradigm, and that interfaces with the OLAP tool employed (i.e., an OLAP tool properly licensed and deployed) within an enterprise's network via the OLAP tool's application program interface (API).

In an embodiment, the application of the present invention also provides a graphical user interface for allowing the analyst to assure the technical correctness of OLAP reporting projects.

When executed after OLAP project schema development and testing, but before production report generation, the application of the present invention serves as a substantial data quality control process by producing a report that may be used to improve the definition of the project schema, and improve peer components (i.e., data warehouse data and data warehouse metadata) of the OLAP reporting project. Such improvements to the data warehouse metadata includes, for example, checking/changing metadata definitions such as which column in a table is a foreign key to another table. Further, such improvements to the data warehouse data includes, for example, checking/correcting missing data values or checking/deleting extraneous data values.

An advantage of the present invention is that it defines a proactive, repeatable methodology to help prove or disprove the "correctness" of any OLAP project.

Further features and advantages of the present invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements.

DETAILED DESCRIPTION

I. Overview

Figure 1:
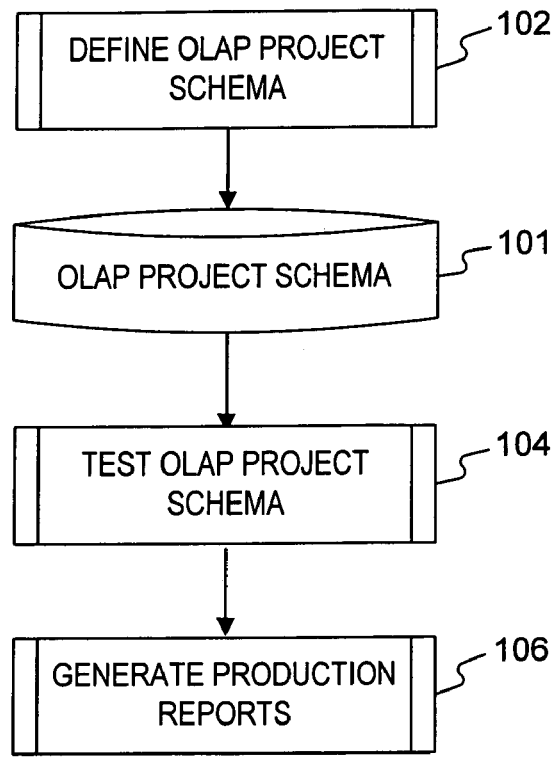
FIG. 1 is a flowchart of an exemplary OLAP project schema development, project schema testing and report development workflow in which the present invention, in an embodiment, would be implemented.

The present invention is directed to a system, method and computer program product for validating the technical correctness of an OLAP reporting project.

In an embodiment, the present invention is implemented within an enterprise's OLAP project schema development, project schema testing and report generation workflow. An overview of a typical workflow (without the benefit of the present invention) is described below.

The purpose of OLAP project schema development is to design and implement a complete and accurate model which enables different units, divisions or business areas within an enterprise to accomplish dynamic reporting using the enterprise's OLAP tool. Thus, it is common that, within an enterprise, three types of personnel play a role in OLAP project schema development: (1) business analyst ("BA") (i.e., personnel from different units, divisions or business areas) who submit business-oriented, project-specific dynamic reporting requirements to an OLAP analyst ("OA") (e.g., IT personnel); (2) data analyst ("DA") (e.g., IT personnel charged with data warehouse ("DW") development) who identify application data sources which will satisfy the reporting requirements; and (3) OA who analyze and research the capabilities of the OLAP tool.

An OA integrates information from the three above-mentioned categories of personnel in order to produce an OLAP schema. That is, the OA integrates data, reporting needs and capabilities in order to produce an OLAP schema. The OLAP schema might or might not be in conformance with industry accepted best practices such as dimensional modeling, star schema or snowflake schema design, etc. The schema enables the OLAP tool to create applications for dynamic OLAP reporting. Key elements of the schema include: (1) a mapping between the DW data tables and reporting requirements (e.g., a partial list of MicroStrategy 7i elements which implement these key elements includes tables, attributes and facts); and (2) a mapping between reporting requirements and the OLAP tool's capabilities (e.g., a partial list of MicroStrategy 7i elements which implement these key elements includes attributes, hierarchies, partition maps and metrics).

In operation, the OLAP tool's SQL generation engine converts the schema into a set of internal, invisible assumptions which are used when processing OLAP project reporting requests. The OA can then run sample report requests to verify the schema and data correctness. This includes: (1)

verification of data output versus expected results; (2) execution of a "View SQL" or like command to compare outputted SQL generated by the OLAP tool versus expected results; and (3) the manual execution of all or part of the generated SQL in the native, database management system (DBMS) that hosts the DW to verify correctness of query subset results.

Production OLAP report generation occurs after OLAP project schema development has been completed. As will be appreciated by those skilled in the relevant art(s), OLAP project schema development profoundly impacts production OLAP report generation. That is, production OLAP report generation is completely dependent upon the correctness of the OLAP project schema development. OLAP reports are typically used at the highest levels of an enterprise's management. Business area managers make decisions based on OLAP reports, and managers assume that the schema is designed accurately to meet their reporting requirements.

The present invention helps ensure that the transition from OLAP project schema development to production OLAP report generation does not occur prematurely. It provides a system, method and computer program product for validating the technical correctness of the OLAP reporting project, most notably the OLAP project schema component, such that the likelihood of errors is systematically reduced.

The present invention is now described in more detail herein in terms of the above exemplary workflow (and more specifically, workflow 100 described below with reference to FIG. 1), and the MicroStrategy 7i OLAP tool. This is for convenience only and is not intended to limit the application of the present invention. In fact, after reading the following description, it will be apparent to one skilled in the relevant art(s) how to implement the following invention in alternative embodiments (e.g., using other development workflows or OLAP tools commercially-available from numerous vendors such as Informatica Corporation, DataMirror Corporation, etc.).

The terms "user," "designer," "organization," "analyst," "developer" and/or the plural form of these terms are used interchangeably throughout herein to refer to those who would access, use, be affected by and/or benefit from the tool that the present invention provides for validating the technical correctness of an OLAP reporting project such that the likelihood of errors is systematically reduced.

II. Schema Development, Schema Testing and Report Generation Workflow

Referring to FIG. 1, an flowchart illustrating an exemplary enterprise OLAP reporting project schema development, schema testing and report generation workflow 100 is shown. Workflow 100 is a prerequisite for any OLAP reporting project (i.e., it must occur regardless of any control efforts such as those contemplated by the present invention). Workflow 100 is described herein, however, for the purpose of establishing an environment (i.e., a context) in which the present invention would be implemented. Workflow 100 includes three exemplary processes: a process 102, a process 104 and a process 106. Workflow 100 also includes an OLAP project schema 101. All four of these components are described in greater detail below.

Workflow 100 begins with process 102 which defines the OLAP project schema 101. Process 104 then tests the OLAP project schema 101, and process 106 generates production reports.

Figure 2:
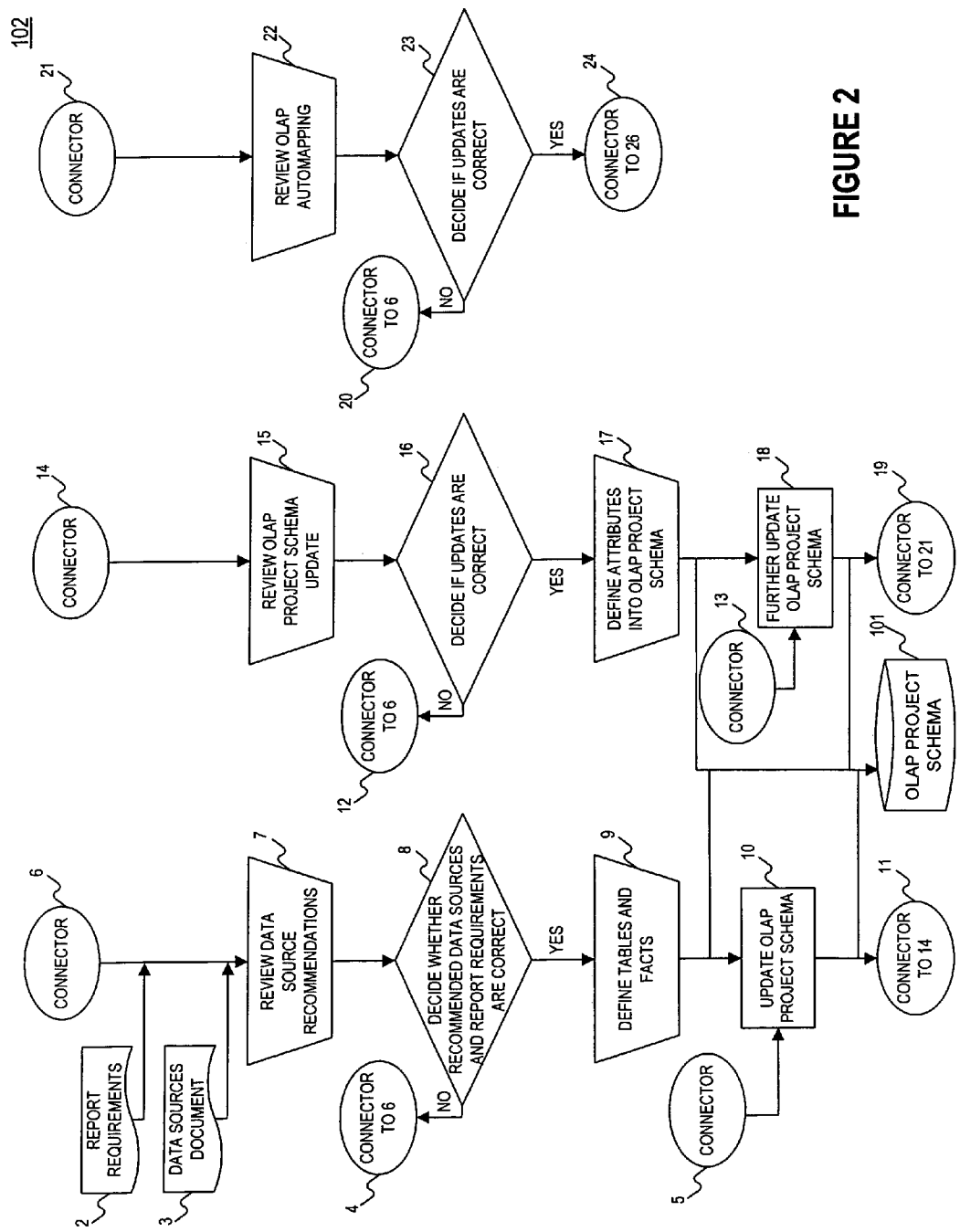
FIG. 2 is a flowchart of an exemplary OLAP project schema development process in which the present invention, in an embodiment, would be implemented. The process in FIG. 2 represents the same exemplary OLAP schema development process from FIG. 1, but it is illustrated in greater detail.

Referring to FIG. 2, a more detailed flowchart of process 102 is shown. Process 102 defines the OLAP project schema. Process 102 occurs in any OLAP project environment, regardless of whether the invention is implemented. It is described herein, however, for the purpose of establishing an environment in which the present invention would be implemented.

Process 102 begins at connector 6. At manual process 7 the OA reviews data source (tables and facts) recommendations provided in data sources document 3 provided by the BA. The data sources should provide the data elements to satisfy the report requirements 2. At decision 8, the OA decides whether the recommended data sources and report requirements are correct. If not, then connector 4 refers process 102 to the beginning of process 102 at connector 6. If so, then at manual process 9 the OA defines tables and facts into the OLAP project schema 101.

In an embodiment, the OLAP tool 10 further updates the OLAP project schema 101 via an automatic naming convention implementation algorithm (e.g., using the Automapping feature in MicroStrategy 7i) applied to the newly defined tables and facts. In general, process 10 represents any kind of automatic association or project schema update by the OLAP tool.

Connector 11 refers process 102 to connector 14. At manual process 15, the OA reviews the OLAP tool automatic project schema update from process 10. At decision 16, the OA decides whether the updates are correct. If not, then connector 12 refers process 102 to the beginning of the process at connector 6. If so, then at manual process 17, the OA defines attributes into the OLAP project schema 101.

In an embodiment, the OLAP tool 18 further updates the OLAP project schema 101 via, for example, Automapping applied to the newly defined attributes. (Tool 18 represents the same OLAP tool as that represented by tool 10; it is redrawn solely to simplify FIG. 2.) In general, process 18 represents any kind of automatic association or project schema update by the OLAP tool.

Connector 19 refers process 102 to connector 21. At manual process 22, the OA reviews the OLAP tool automapping from process 18. At decision 23, the OA decides whether the updates are correct. If not, then connector 20 refers process 102 to the beginning of the process at connector 6. If so, then connector 24 refers process 102 to connector 26 in FIG. 3.

Figure 3:
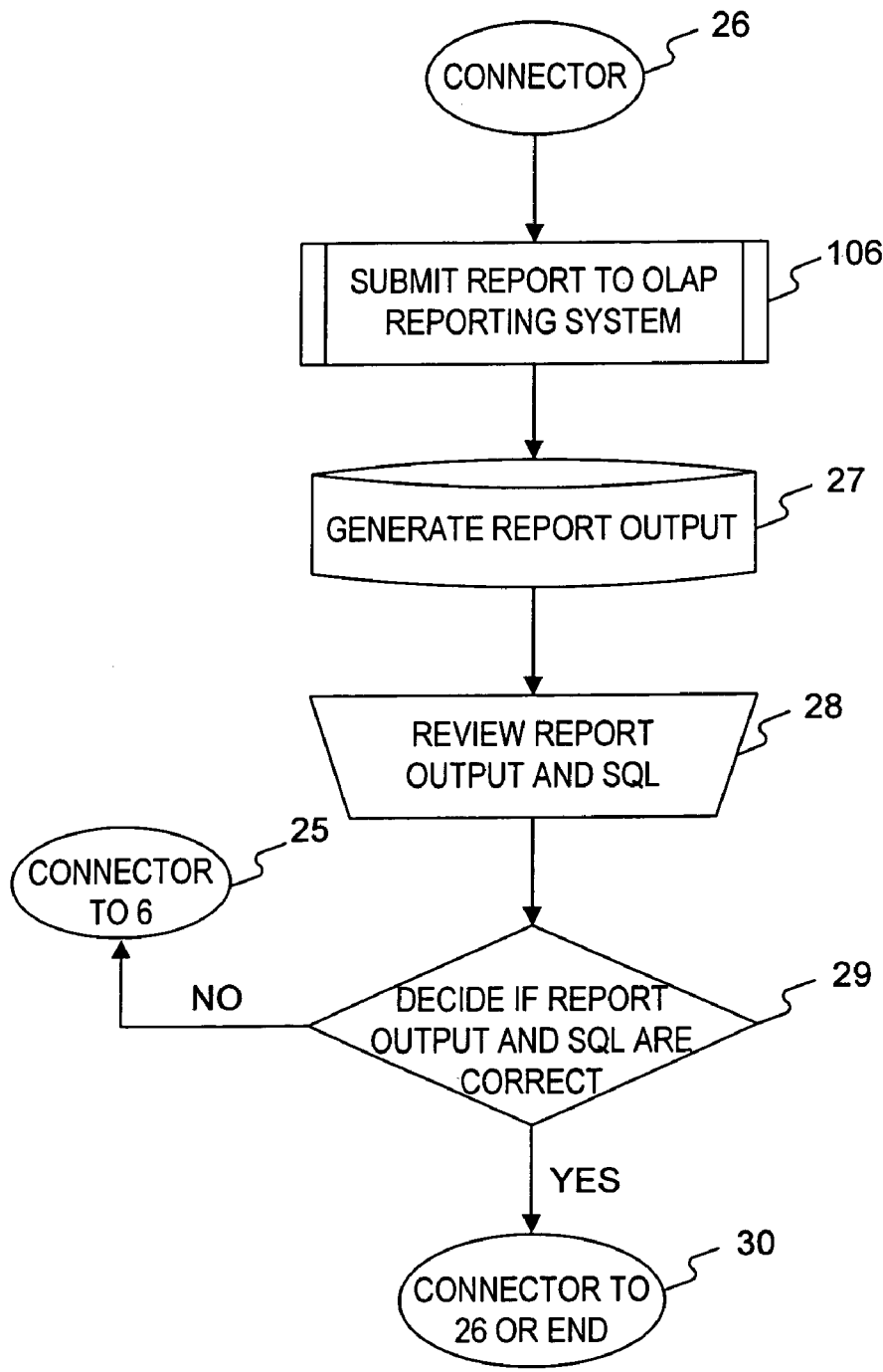
FIG. 3 is a flowchart of an exemplary OLAP project schema testing process in which the present invention, in an embodiment, would be implemented. The process in FIG. 3 represents the same exemplary OLAP schema testing process from FIG. 1, but it is illustrated in greater detail.

Referring to FIG. 3, a more detailed flowchart of process 104 is shown. Process 104 tests the OLAP project schema. Process 104 occurs in any OLAP project environment, regardless of whether the invention is present. It is described herein, however, for the purpose of establishing an environment in which the present invention would be implemented.

Process 104 begins at connector 26. At process 106, a particular report is submitted to the OLAP reporting system, and report output 27 is generated. (Process 106 is described in greater detail below with reference to FIG. 4.) The report output 27 is not only visually-friendly report output, but also the SQL which generates the database result set which populates the report.

At manual process 28, the OA reviews the report output and its generated SQL. At decision 29, the OA decides whether the report output and its generated SQL are correct. If not, then the OLAP project schema apparently is defined incorrectly, and connector 25 refers process 104 to the beginning of process 102 at connector 6. If so, then the OLAP project schema apparently is defined correctly, and connector 30 refers process 104 to the beginning of the process at connector 26, where the testing process repeats with a different particular report. The process loop delimited by connectors 26 and 30 ends when all test reports have been run successfully, and the process loop delimited by connectors 6 and 30 ends when the OLAP project schema 101 has been tested successfully (i.e., validated).

As will be appreciated by those skilled in the relevant art(s), implementing controls during steps 7, 15 and 22 of process 102 and step 28 of processes 104 can be manually intensive and difficult to repeat with consistency. Further, process 104 (i.e., reconciling actual results with expected results) is intended to control process 102. Such manual steps for testing can be inconsistent among different OA's within an enterprise, and difficult to accomplish on a large scale. Lastly, the compare-to values in decision 29, if generated from manually-written SQL, are susceptible to the same errors as the OLAP tool-generated SQL.

Figure 4:
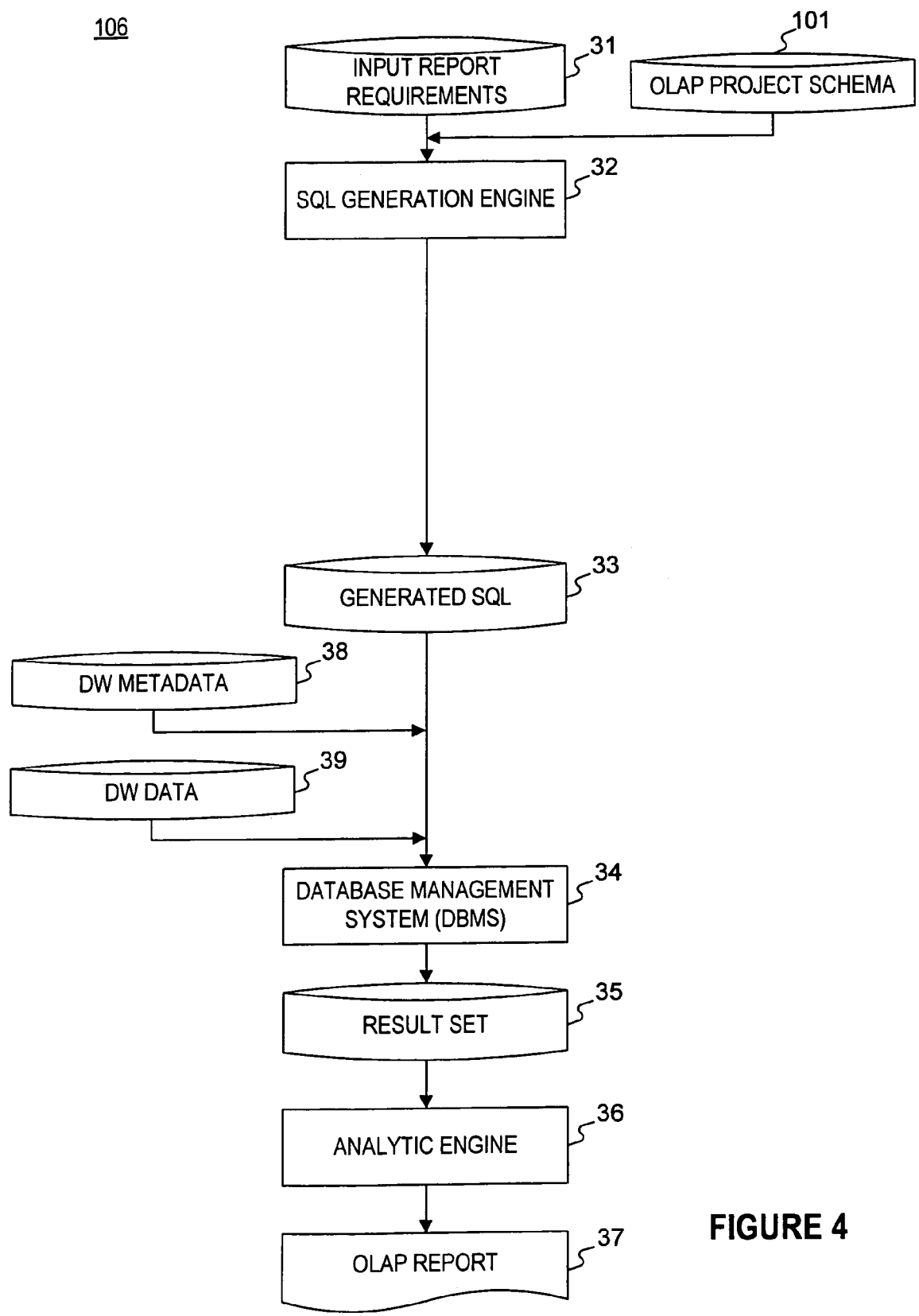
FIG. 4 is a flowchart of an exemplary OLAP report development process in which the present invention, in an embodiment, would be implemented. The process in FIG. 4 represents the same exemplary OLAP report development process from FIG. 1, but it is illustrated in greater detail.

Referring to FIG. 4, a more detailed flowchart of process 106 is shown. Process 106 generates production reports. Process 106 occurs in any OLAP project environment, regardless of whether the invention is present. It is described herein, however, for the purpose of establishing an environment in which the present invention would be implemented.

Process 106 represents the primary purpose for which the OLAP system exists. Business analysts generate production reports for both temporary (e.g., analytical) and permanent (e.g., archival) usage. Process 106 occurs any number of times over the life of the OLAP application. In process 106, the SQL generation engine 32 accepts as input report requirements 31 and references the OLAP project schema 101. It produces SQL 33 as output. The DBMS 34 accepts as input the generated SQL 33, along with DW metadata 38 and DW data 39, and it produces result set 35. In an embodiment, the result set 35 is further refined and formatted by an analytic engine 36, which produces an OLAP report 37.

III. Data Quality Process—Summary

Figure 5:
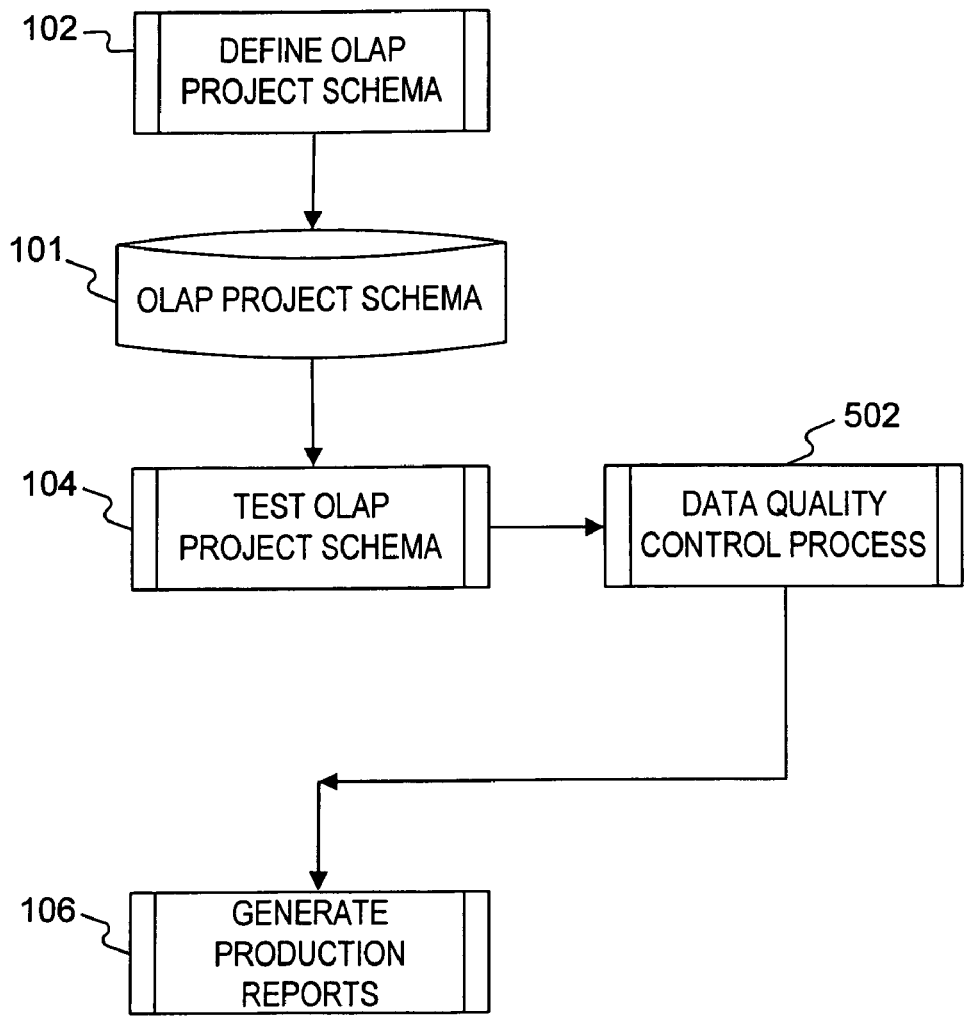
FIG. 5 is a flowchart of an exemplary OLAP project schema development, project schema testing and report development workflow with an inserted, substantial data quality control process, according to one embodiment of the present invention.

Referring to FIG. 5, substantial data quality control process 502, in an embodiment, is inserted into workflow 100 after the implementation of the schema (i.e., after processes 102 and 104) and before production report generation (i.e., before process 106). This allows the OLAP project schema 101 design to be validated according to the present invention, increasing confidence in the overall application.

Figure 6:
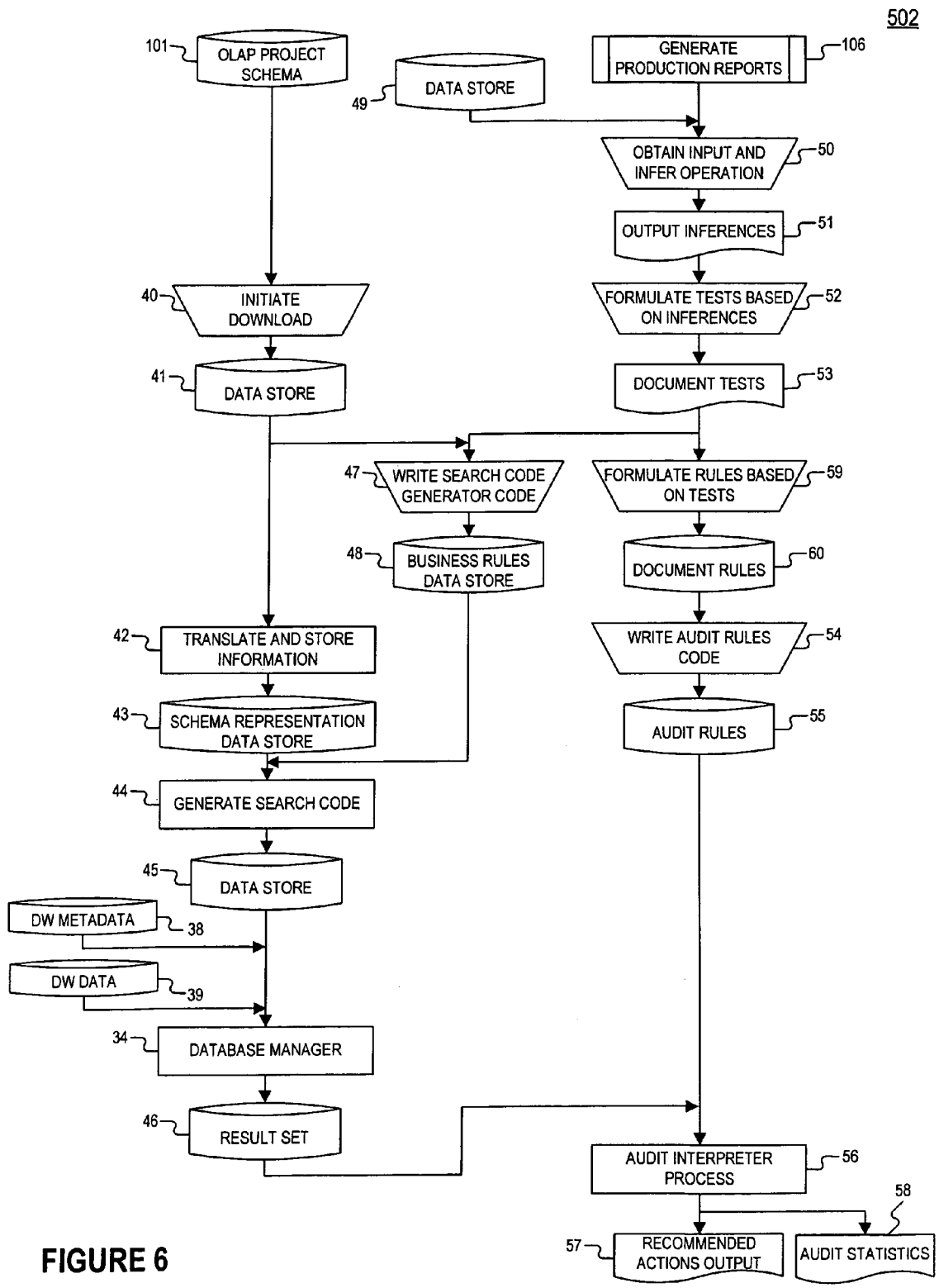
FIG. 6 is a flowchart of an exemplary substantial data quality control process according to one embodiment of the present invention. The process shown in FIG. 6 represents the same exemplary substantial data quality control process of FIG. 5, but it is illustrated in greater detail.

Referring to FIG. 6, a more detailed flowchart of exemplary substantial data quality control process 502 according to one embodiment of the present invention is shown. Process 502 is similar to process 102 because it generates reports. But instead of generating reports solely for DW data (as in process 102), process 502 generates reports pertaining to the relationships among the SQL generation engine, the OLAP project schema, DW metadata and DW data.

Figure 7A:
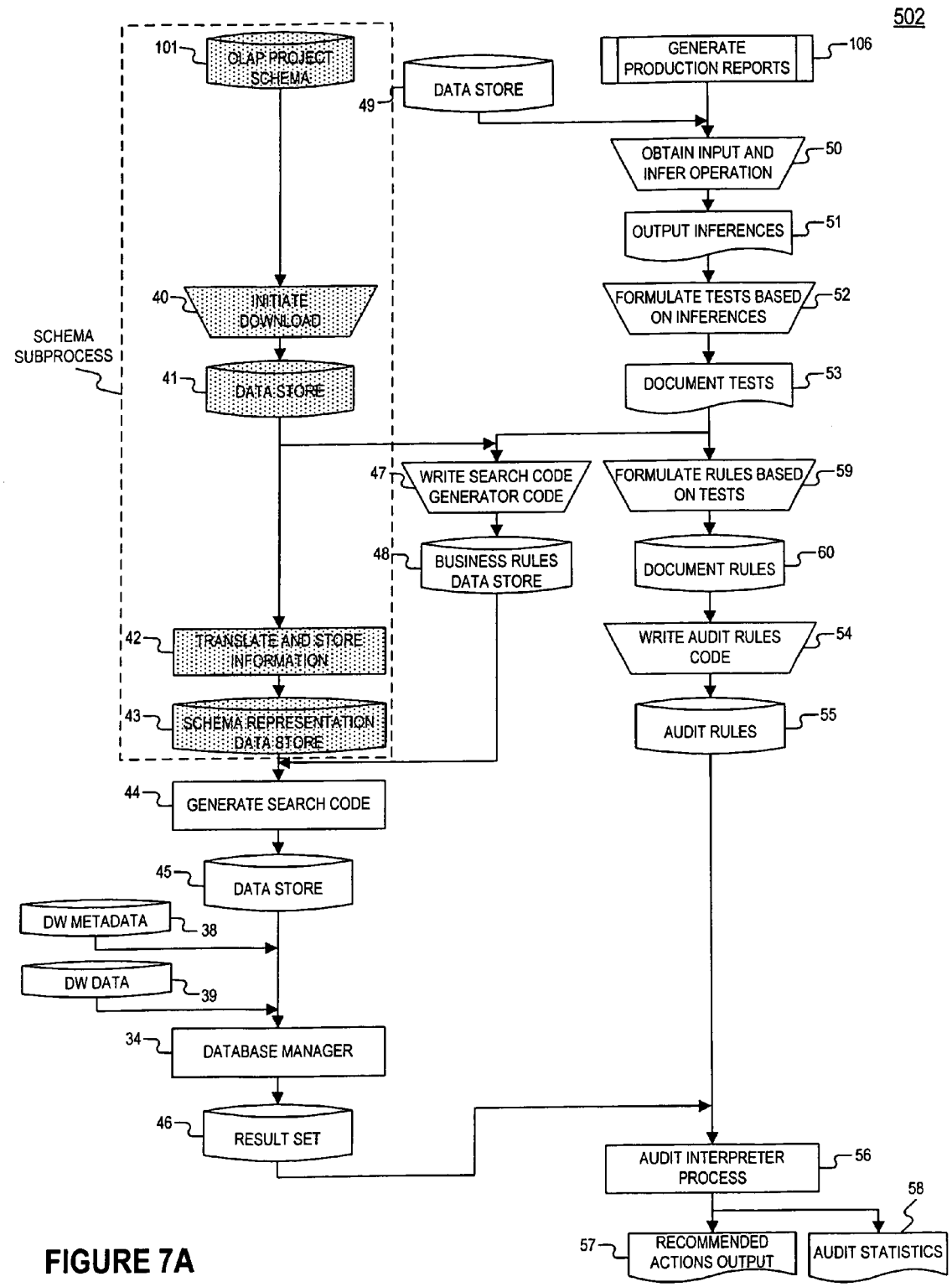
FIG. 7A is a flowchart of an exemplary data quality control "schema" subprocess according to one embodiment of the present invention. The subprocess shown in FIG. 7A represents the first of four subprocesses of the process shown in FIG. 6.

Referring to FIG. 7A, information from the OLAP project schema 101 is stored via the "schema" subprocess within process 502.

Figure 7B:
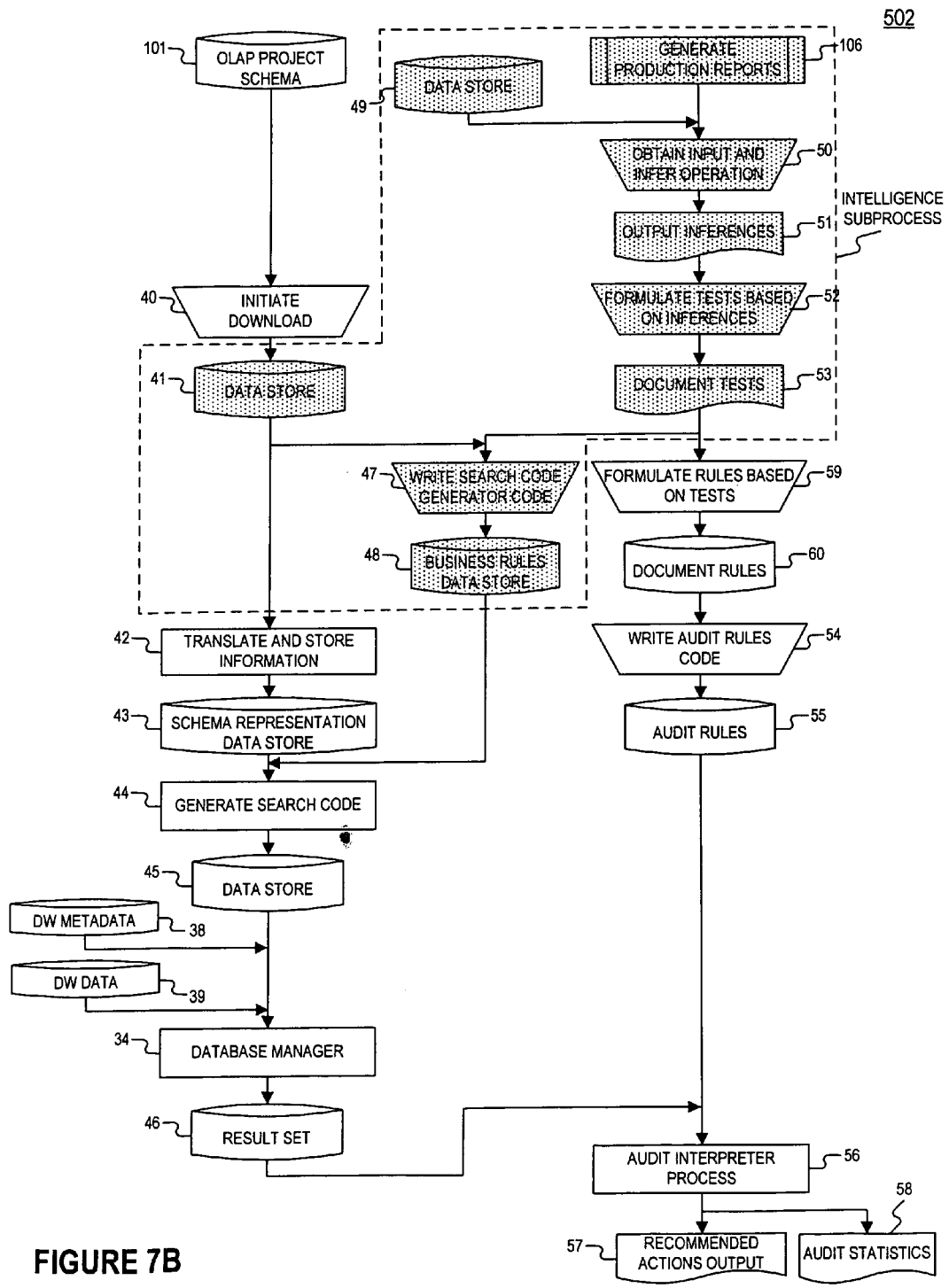
FIG. 7B is a flowchart of an exemplary data quality control "intelligence" subprocess according to one embodiment of the present invention. The subprocess shown in FIG. 7B represents the second of four subprocesses of the process shown in FIG. 6.

Referring to FIG. 7B, the "intelligence" subprocess of process 502 identifies and enters predictable, intelligent behavior embedded in the SQL generation engine component, based upon conditions external to that component. This information is augmented with the schema information from the "schema" subprocess (FIG. 7A), and as a result this subprocess anticipates the universe of potential reports which may be created during OLAP report generation. As will be appreciated by those skilled in the relevant art(s) after reading the description herein, the anticipation does not need to be complete in order to be useful; even a partial understanding of potential reports can be tested to the overall benefit of an enterprise's reporting efforts.

Figure 7C:
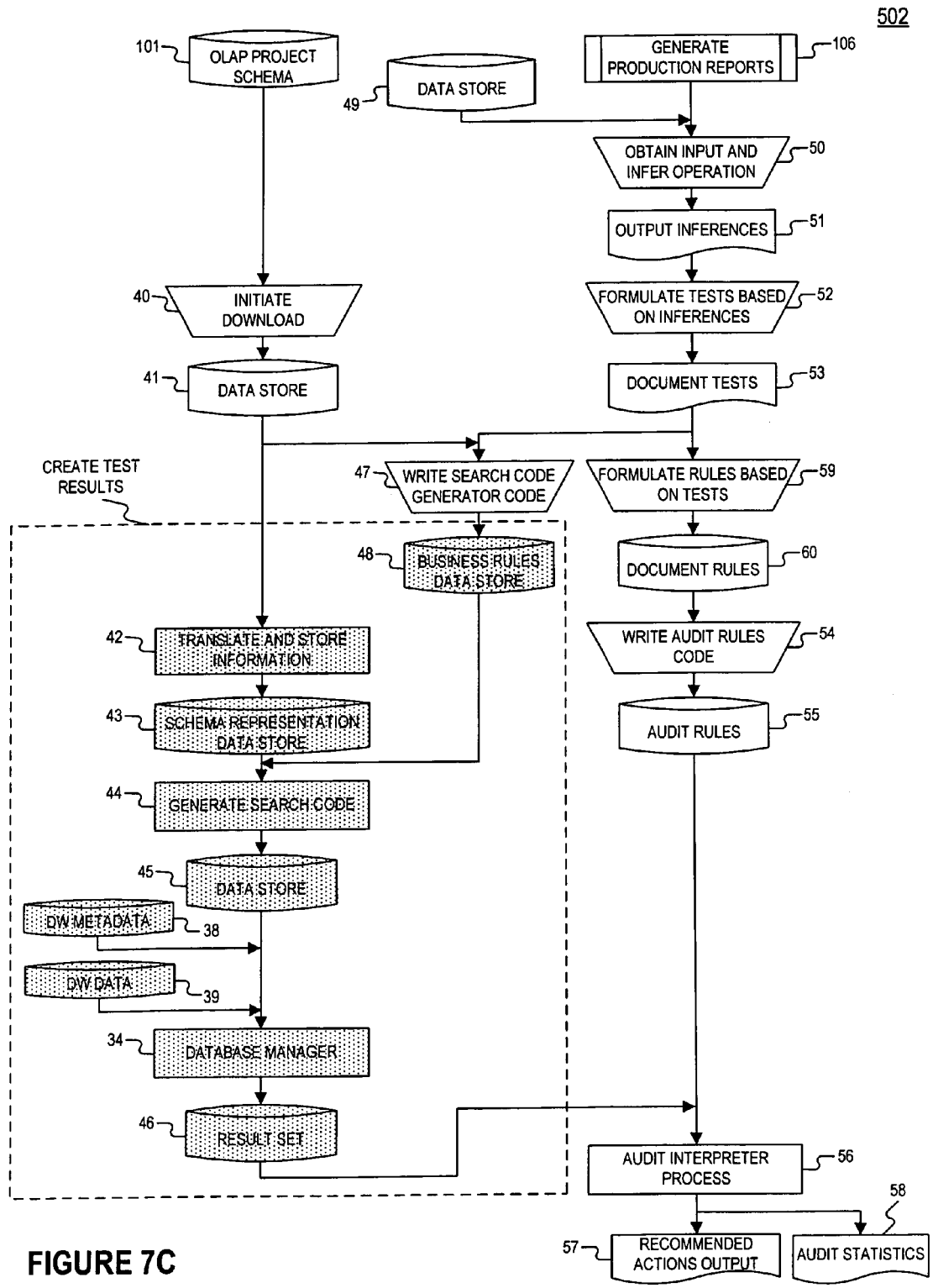
FIG. 7C is a flowchart of an exemplary data quality control "results" subprocess according to one embodiment of the present invention. The subprocess shown in FIG. 7C represents the third of four subprocesses of the process shown in FIG. 6.

Referring to FIG. 7C, rules from the "intelligence" subprocess create test results in the "results" subprocess within process 502. These results help establish whether, for the universe of potential OLAP reports within this project, four inputs are synchronized—SQL generation engine heuristics, OLAP project schema, DW metadata and DW data. This is because the primary risk to the correctness of the OLAP report generation process is that these four inputs are not synchronized. Process 502 audits the interdependent nature of these four inputs, which are described in the following four paragraphs.

The first input is the estimated SQL generation engine heuristics. Because the heuristics of the OLAP tool are unknown (i.e., proprietary to the vendor supplying the OLAP tool), in an embodiment, estimated SQL generation engine heuristics are an approximation of a subset of the real heuristics. Recording estimates can be accomplished by creating a collection of rules.

The second input is the OLAP project schema. The OLAP project schema is the set of parameters which must be inputted into the schema definition screens within the OLAP tool. These parameters are input into various OLAP tool development screens. Relationships between the various parameters are sometimes explicit and sometimes implicit. As will be appreciated by those skilled in the relevant art(s) after reading the description herein, the set of parameters that must be inputted into the schema definition screens within the OLAP tool equates to the following question: "What information does the OLAP tool need to always generate correct SQL?"

The third input is the DW metadata. The DW metadata defines what DW data elements mean and how they are used. Metadata is particularly useful to the OLAP project schema development process in the context of relationships between data elements. Example questions of metadata are: "What is the precise usage of a data element which uses a particular column name? If two distinct columns share the same name, are the two columns identical in all business contexts? In some contexts? In no contexts?"

The fourth input is the DW data. DW data is the actual data in the tables which are referenced by the OLAP tool.

Figure 7D:
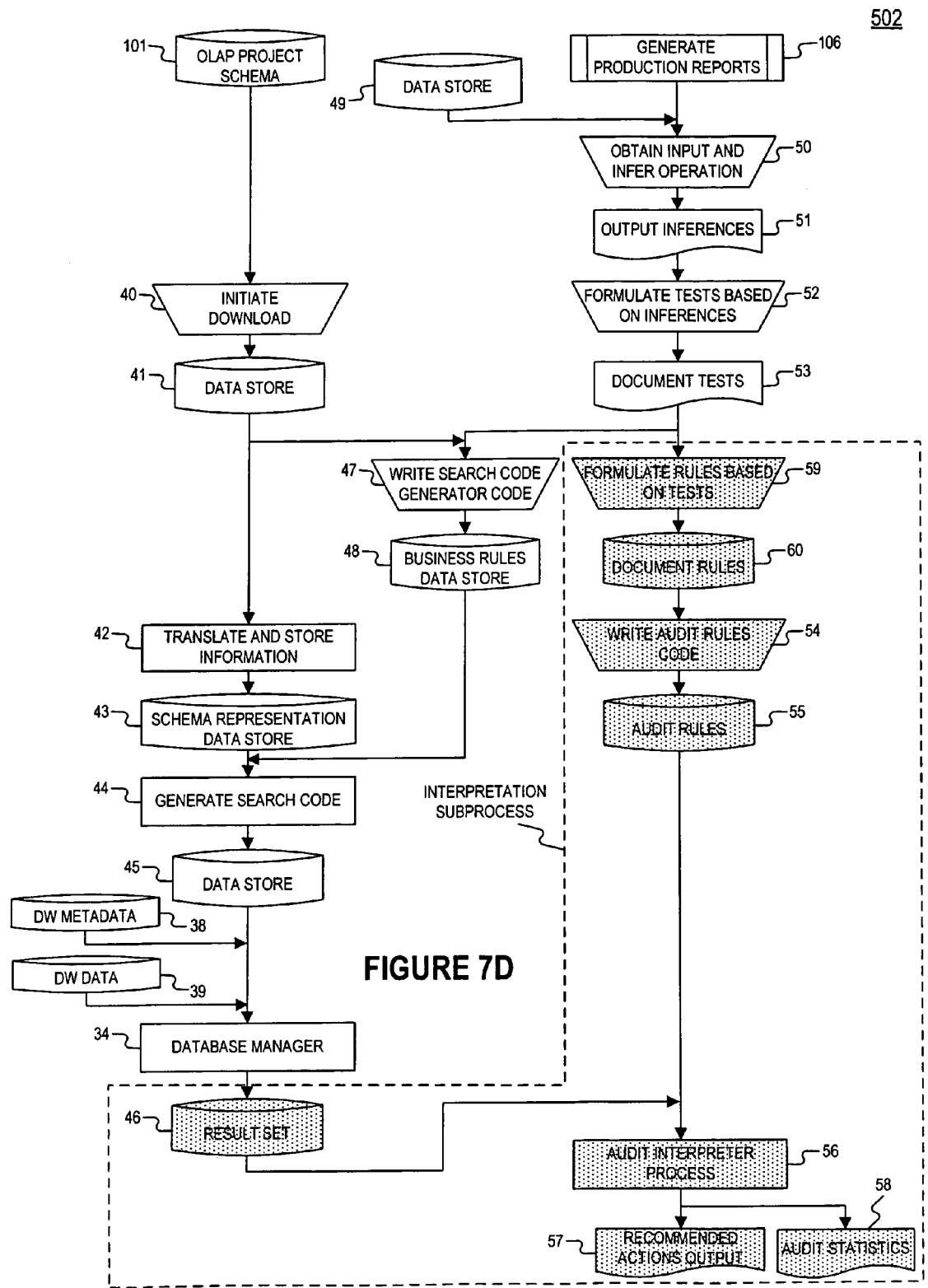
FIG. 7D is a flowchart of an exemplary data quality control "interpretation" subprocess according to one embodiment of the present invention. The subprocess shown in FIG. 7D represents the fourth of four subprocesses of the process shown in FIG. 6.

Now referring to FIG. 7D, the "interpretation" subprocess within process 502 produces OLAP correctness recommendations and statistics.

At the conclusion of process 502, the OA is able to evaluate the technical correctness of the OLAP project. By applying process 502 proactively and then implementing its correctness recommendations among the four synchronized inputs, the OA ensures that the likelihood of errors is systematically reduced, and that the quality of OLAP reporting within the project is systematically improved.

IV. Data Quality Process—Detail

Referring to FIG. 7A, the "schema" subprocess (represented by the shaded portions of the flowchart shown in FIG. 7A) makes OLAP project schema 101 data available for later use by placing the data in an internal schema representation 43. Data store 43 only needs to represent those parameters from the OLAP project schema which are referenced in the OA schema business rules data store 48.

In an embodiment where the OLAP project schema 101 is directly and fully readable by an application interface (e.g., the MicroStrategy 7i API), subprocess steps 40, 41, 42 and 43 are unnecessary, and step 44 can be implemented such that it extracts data directly from OLAP project schema 101.

In an alternate embodiment—where OLAP project schema 101 is not directly and fully readable by an application interface such as an OLAP tool's API, but in which a download from the OLAP tool can be achieved via a programmatic script—process steps 40 and 41 are unnecessary. In such an embodiment, a utility software program 42 extracts information from the OLAP project schema 101. Utility software 42 would then translate and store the information into data store 43. As will be appreciated by those skilled in the relevant art(s) after reading the description herein, any number of program scripts can be written in any number of languages where such program's effect is to place OLAP project schema information in a format and place (i.e., data store 43) that is usable by process 44.

In an alternate embodiment—where OLAP project schema 101 is not directly and fully readable by an application interface and a direct download cannot be achieved—process steps 40 and 41 serve a useful intermediary purpose to make OLAP project schema data available for later use. That is, in such an embodiment, manual intervention 40 initiates a download into data store 41. Utility software 42 extracts information from the OLAP project schema download 41. The utility software 42 would then translate and store the information into data store 43.

In yet another embodiment—where no application interface is available and no download is possible—full manual intervention 40 is required. Non-downloaded OLAP project schema information which is deemed important is manually viewed from the OLAP project schema 101 and manually entered in data store 41. As in the previous embodiment, utility software 42 extracts information from the OLAP project schema download 41. The utility software 42 would then translate and store the information into data store 43.

For the "schema" subprocess of process 502 illustrated in FIG. 7A, any combination of downloads from the OLAP project schema repository and/or manual intervention is appropriate. The key is that by the conclusion of the "schema" subprocess, data store 43 contains a fully readable internal schema representation.

In one embodiment, an OLAP tool API and a scripted partial download is available, but not used, to keep utility software development simple. A manually initiated download returns some, but not all, OLAP project schema data into data store 41. Further information is manually viewed from the OLAP project schema 101 and manually entered into data store 41. The utility software 42 interprets, translates and stores downloaded information 41 into data store 43. In such an embodiment, the utility software code logic implementing process step 42 is coded in Microsoft Visual Basic for Applications (VBA), reading from the MicroStrategy 7i downloaded flat files and writing to Microsoft Access; the OA internal schema representation 43 is stored in Microsoft Access relational tables.

Referring to FIG. 7B, the "intelligence" subprocess (represented by the shaded portions of the flowchart shown in FIG. 7B) produces intelligence 48 for later use. The shaded portions form a subprocess during which the OA surmises, writes and codes inferences about how the SQL generation engine produces SQL. Data store 49 represents assembled product knowledge about the SQL generation engine of the specific OLAP tool the enterprise utilizes (e.g., MicroStrategy 7i). Such knowledge is assembled from various manual data sources. The various sources are represented as a group 49. A list of sources might include but not be limited to: insights from notes taken during any OLAP tool training, the OLAP tool's product documentation, the OLAP tool's knowledge base (e.g., many vendor's maintain an Internet-based knowledge base on their Web sites as part of their customer support offerings), and any knowledge shared by the OLAP tool vendor's sales staff.

The output from process 106 is used as input into manual process 50, which represents OA observations and reasoning about the SQL generated during process 106. At manual process 50 the OA infers how the SQL generation engine, run during process 106, must be operating, given the various input parameters (e.g., OLAP project schema, report template parameters, etc.) within process 106. An example inference might be: "Whenever the OLAP project schema includes a column which is a foreign key, and the report template includes an attribute which is defined in a table which is referenced by the foreign key, then the SQL generation engine will produce SQL which includes a join from the foreign key's table to the table in which the attribute is defined."

At output 51, the OA documents his inferences in a non-computer readable format (e.g., on paper, in English). At manual process 52 the OA formulates hypotheses and tests based upon the inferences from output 51. The hypotheses would postulate occurrences in which conditions for correctness in the OLAP environment are not satisfied. An example hypothesis might be: "If the database contains a foreign key value which does not have a matching primary key value in the table in which the attribute is defined, the generated SQL might be technically correct but the database result set will be too small, and the output report will contain incorrect results."

At output 53, the OA documents his hypotheses and tests in a non-computer readable format (e.g., on paper, in English). A test for the above-mentioned example hypothesis might be: "List all foreign key values which do not have a matching primary key value in all the tables in which all attributes which reference that foreign key are defined. If the list is empty, then this test is satisfied. If the list is not empty, then conditions for correctness in the OLAP environment might not be satisfied and should be further investigated."

As will be appreciated by those skilled in the relevant art(s) after reading the description in the paragraph above, the words "in all the tables" refer to an examination of DW data, and the words "in which all the attributes . . . are defined" indicate a reference to the OLAP project schema. That is, in order to know where to look in the DW for the DW data, it is necessary to reference the OLAP project schema first.

Therefore, at manual process 47, the OA writes search code generator code in a computer-readable language (e.g., SQL). The phrase "search code generator code" simply means "code which generates search code." The "code which generates search code" queries the project schema and produces search code; the "search code" queries the DW data and produces a result set containing possible data discrepancies. In an embodiment, both types of code are SQL. That is, search code generator code SQL for the above-referenced example hypothesis will later query the OLAP project schema internal representation 43 in search of foreign key and primary key column name combinations which are co-defined within a single OLAP report attribute. The search code generator code 48 SQL will examine the OLAP project schema internal representation 43 but will not examine and compare individual DW values; this occurs later, via search code 45 SQL, and is described below with reference to FIG. 7C.

At data store 48, the search code generator code is stored for later use. Data store 48, by codifying hypotheses and tests about the SQL generation engine behavior, is the first of the above-mentioned four principal OLAP environment components that must be synchronized in order for the OLAP tool's report results to be accurate and complete.

In an embodiment, observations are recorded in data store 49 and process 106 is run repeatedly over time. As the OA becomes more familiar with the SQL generation engine algorithms, data store 48 becomes richer both in the number and in the comprehensiveness of the hypotheses and tests represented.

Many levels of comprehensive tests are possible. The example cited above searches for errors in referential integrity, a well understood yet common error in relational and OLAP environments. Another hypothesis might yield a test which would search for mismatches between OLAP fact tables and their performance aggregation tables—also common in OLAP environments and not specific to a particular OLAP reporting tool. A more advanced set of hypotheses might consider the SQL generation which is unique to a particular OLAP reporting tool (e.g., MicroStrategy 7i).

An example of a tool-specific hypothesis might be: "The SQL generation engine will produce SQL which joins to any of the multiple tables in an attribute's DESC form table list whenever the attribute's DESC is to be displayed, as indicated on the attribute's Display tab." The hypothesis' related test might be: "List all foreign key values which, if joined to any of the multiple tables could produce differing reporting DESC results for that attribute. If the list is empty, then this test is satisfied. If the list is not empty, then conditions for correctness in the OLAP environment might not be satisfied and should be further investigated."

In alternate embodiments, more advanced set of hypotheses might challenge the correctness of tool-specific SQL generation in combination with dimensional modeling techniques such as identically named columns representing distinct business entities in similar and related but non-identical dimensions.

Once data store 48 is sufficiently populated with meaningful tests, later process steps can execute and interpret the test results, yielding an improved OA understanding of the correctness of the OLAP environment and its principal components.

Referring to FIG. 7C, the "results" subprocess (represented by the shaded portions of the flowchart shown in FIG. 7C) makes raw analysis information available for later use by generating and storing the information in result set audit output 46. Data from data store 48 is inputted into process step 44 which generates search code in data store 45. The SQL search code 45 is then generated which, when submitted by database manager 34, searches for discrepancies among the four inputs (i.e., occurrences in which the four inputs are not synchronized) in accordance with the OA schema business rules 53. In an embodiment, search code 45 is generated as SQL. In alternate embodiments, the generated search code can be in a form other than SQL (e.g., C programming language code with embedded SQL).

In one embodiment, data store 48 is implemented in Microsoft Access as a series of queries and data store 43 is implemented as a series of tables. Therefore, process 44 is implemented as the submission of SQL contained in data store 48 against the data contained in data store 43. In such an embodiment, the present invention provides a Microsoft Access front-end which gives the OA one touch generation of the OA search code 45. When the search code 45 is generated by database manager 34, it also reads as input DW metadata 38 and DW data 39. In an embodiment, database manager 34 is implemented as a database manager shell script which reads the search code 45 and writes the result set to a result set 46 flat file. In an embodiment, database manager 34 adds convenience tags so that audit interpreter process 56 will be able to recognize the various output types in result set 46.

At this point in the "results" subprocess, result set 46, a product of the search code 45, contains information coordinating the four primary inputs—the SQL generation engine, the OLAP project schema, the DW metadata and DW data—which must always be synchronized.

Referring to FIG. 7D, the "interpretation" subprocess (represented by the shaded portions of the flowchart shown in FIG. 7D) makes refined OLAP correctness information available (for later manual use) by generating and storing the information in recommended actions output 57 and audit statistics 58.

At manual process 59 the OA formulates rules based upon the tests from output 53. At output 60, the OA documents the rules in a non-computer readable format (e.g., on paper, in English). The rules express how the results from the tests will be interpreted. An example rule, from the hypothesis and test given above, might be: "If the test result set is not empty, then the project schema, the DW metadata and the DW contain a discrepancy. Display an error message stating that the project schema assumes that each foreign key has a matching primary key value in each table in which the attribute is defined. Then list each test result row." As will be appreciated by those skilled in the relevant art(s), this kind of discrepancy is most likely due to a DW data omission, and not to a project schema or DW metadata error. Therefore the rule might continue with a suggested resolution which will be included in recommended actions output 57: "Confirm that this discrepancy is caused by missing data in the DW, and then take necessary actions to include the missing data." At manual process 54, the OA writes audit rules code in a computer-readable language (e.g., C).

At process step 56, an OA audit interpreter process is executed. Code logic implementing audit interpreter process 56 interprets the formatted result sets 46 in the context of audit rules 55. It captures data quality statistics in data store 58 and sorts the results into an error recommended actions report stored in data store 57.

The code logic implementing step 56, in an embodiment, is coded in any high-level programming language (e.g., C). The code logic reads data store 46, and interprets each returned result set according to the kinds of possible errors identified at audit rules 55. In an embodiment, process 56 includes code logic to allow for the presentation of recommended actions to the OA's, business area data quality advocates and other enterprise-wide data quality advocates in a format more meaningful and easier to read than results set data store 46 itself.

The recommended actions report 57 can be as detailed as desired. For example, in an embodiment, the recommended actions report 57 includes specific suggested OLAP report scenarios (e.g., specific attributes and/or metrics placed on a single report) that will cause identified reporting errors. One will notice that the recommended actions report 57 does not contain actual OLAP reporting errors. Instead, recommended actions report 57 contains a list of recommendations about rows in the database which somehow are not synchronized with the SQL generation engine's generation algorithms, the OLAP project schema, the DW metadata or the DW data.

These rows indicate the presence of seeds of potential OLAP reporting errors but are not themselves reporting errors. Therefore, the recommended actions report 57 includes the information which the OA can use for the resolution of conditions which can cause potential OLAP reporting errors. An example would codify the idea to: "Talk to the business data owners about correcting either erroneous foreign key or primary key values from the data warehouse, because there are foreign keys present which can never join properly to a matching primary key. For example, an erroneous reporting result might occur whenever these specific foreign keys are used in SQL generation engine-generated SQL when the Product attribute is placed on an OLAP report: 'X35', 'Y55'."

In one embodiment, additional code logic implementing presentation capabilities of audit interpreter process 56 is coded with the Actuate platform (available from the Actuate Corporation of South San Francisco, Calif.). The additional logic reads the OLAP recommended actions data store 57 and presents them over the enterprise's corporate network (e.g., intranet). The sort and search capabilities of Actuate are useful for formatting the recommended actions 57 according to specific presentation needs.

V. Example Implementations

The present invention (i.e., workflow 100, process 502 or any part(s), function(s) or subprocess(es) thereof) may be implemented using hardware, software or a combination thereof and may be implemented in one or more computer systems or other processing systems. Useful machines for performing the operation of the present invention include general purpose digital computers or similar devices.

Figure 8:
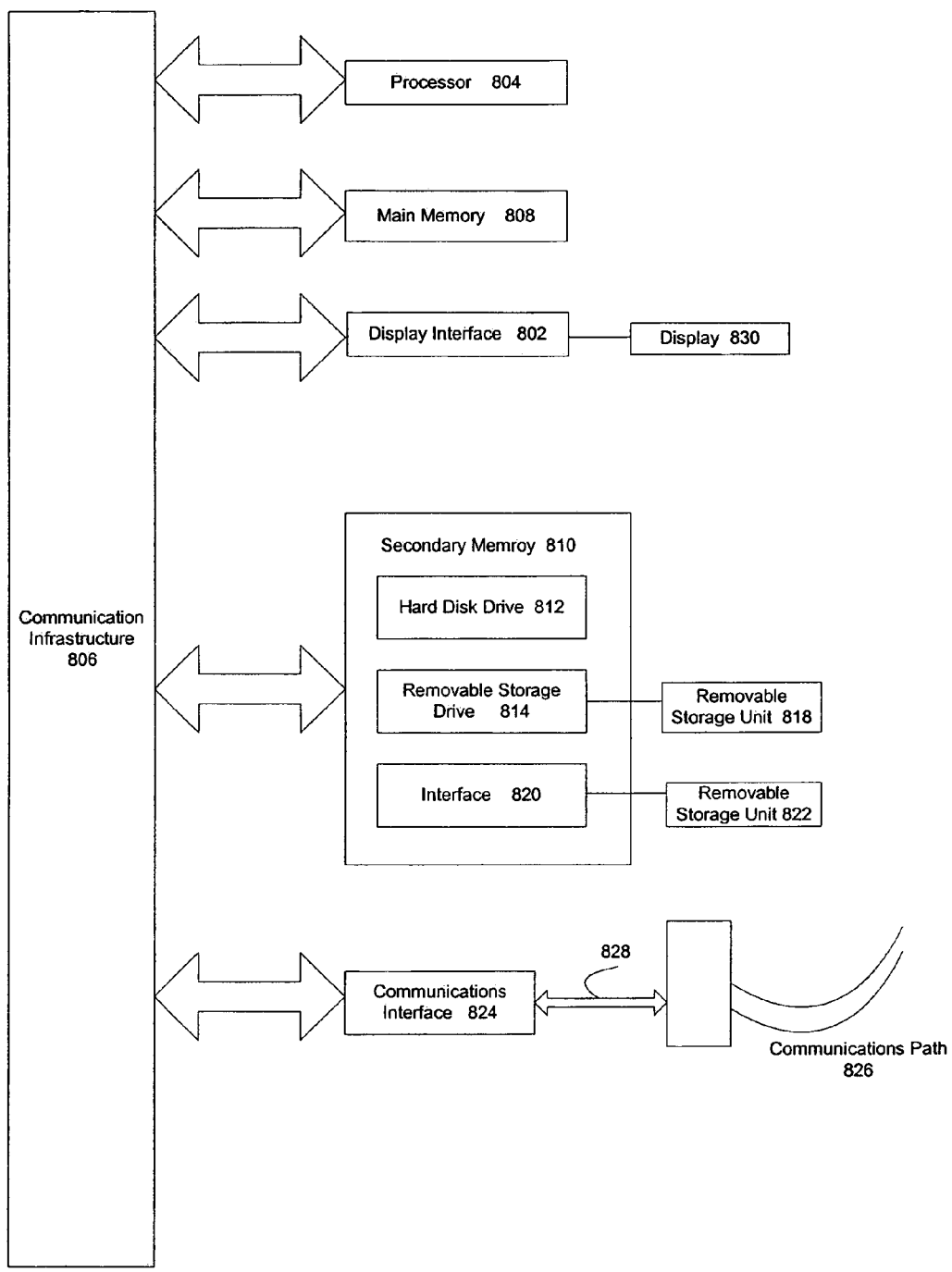
FIG. 8 is a block diagram of an exemplary computer system useful for implementing the present invention.

In fact, in one embodiment, the invention is directed toward one or more computer systems capable of carrying out the functionality described herein. An example of a computer system 800 is shown in FIG. 8.

The computer system 800 includes one or more processors, such as processor 804. The processor 804 is connected to a communication infrastructure 806 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 800 can include a display interface 802 that forwards graphics, text, and other data from the communication infrastructure 806 (or from a frame buffer not shown) for display on the display unit 830.

Computer system 800 also includes a main memory 808, preferably random access memory (RAM), and may also include a secondary memory 810. The secondary memory 810 may include, for example, a hard disk drive 812 and/or a removable storage drive 814, representing a floppy disk drive, a magnetic tape drive, an optical disk drive, etc. The removable storage drive 814 reads from and/or writes to a removable storage unit 818 in a well known manner. Removable storage unit 818 represents a floppy disk, magnetic tape, optical disk, etc. which is read by and written to by removable storage drive 814. As will be appreciated, the removable storage unit 818 includes a computer usable storage medium having stored therein computer software and/or data.

In alternative embodiments, secondary memory 810 may include other similar devices for allowing computer programs or other instructions to be loaded into computer system 800. Such devices may include, for example, a removable storage unit 822 and an interface 820. Examples of such may include a program cartridge and cartridge interface (such as that found in video game devices), a removable memory chip (such as an erasable programmable read only memory (EPROM), or programmable read only memory (PROM)) and associated socket, and other removable storage units 822 and interfaces 820, which allow software and data to be transferred from the removable storage unit 822 to computer system 800.

Computer system 800 may also include a communications interface 824. Communications interface 824 allows software and data to be transferred between computer system 800 and external devices. Examples of communications interface 824 may include a modem, a network interface (such as an Ethernet card), a communications port, a Personal Computer Memory Card International Association (PCMCIA) slot and card, etc. Software and data transferred via communications interface 824 are in the form of signals 828 which may be electronic, electromagnetic, optical or other signals capable of being received by communications interface 824. These signals 828 are provided to communications interface 824 via a communications path (e.g., channel) 826. This channel 826 carries signals 828 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 814, a hard disk installed in hard disk drive 812, and signals 828. These computer program products provide software to computer system 800. The invention is directed to such computer program products.

Computer programs (also referred to as computer control logic) are stored in main memory 808 and/or secondary memory 810. Computer programs may also be received via communications interface 824. Such computer programs, when executed, enable the computer system 800 to perform the features of the present invention, as discussed herein. In particular, the computer programs, when executed, enable the processor 804 to perform the features of the present invention. Accordingly, such computer programs represent controllers of the computer system 800.

In an embodiment where the invention is implemented using software, the software may be stored in a computer program product and loaded into computer system 800 using removable storage drive 814, hard drive 812 or communications interface 824. The control logic (software), when executed by the processor 804, causes the processor 804 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

VI. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method for validating a reporting project of an On-Line Analytical Processing (OLAP) tool, the method comprising the steps of:

storing an OLAP project schema definition, the OLAP project schema reflecting data and metadata contained in a data warehouse;

storing search code generator code which reflects a set of tests to determine whether a SQL generation engine of the OLAP tool, the OLAP project schema, the data warehouse metadata, and the data warehouse data are valid;

querying the OLAP project schema, utilizing the search code generator code, to return query results;

generating validation code using the query results, the validation code configured to create a validation report by querying the data warehouse metadata and the data warehouse data;

creating the validation report, using the validation code, identifying discrepancies among the SQL generation engine of the OLAP tool, the OLAP project schema, the data warehouse metadata, and the data warehouse data; and outputting the validation report.

2. The method of claim 1, wherein the search code generator code is SQL code.

3. The method of claim 2, wherein the validation code is SQL code.

4. The method of claim 2, wherein the validation code is in the form of a high-level programming language.

5. The method of claim 1, further comprising the step of:
interpreting the validation report, using a set of audit rules, and producing data quality statistics and a list of recommended actions.

6. A computer readable storage comprising a computer program which, when executed by a processor, performs a method for causing a computer to evaluate a reporting project of an On-Line Analytical Processing (OLAP) tool, the method comprising:

storing an OLAP project schema definition, the OLAP project schema reflecting data and metadata contained in a data warehouse;

storing search code generator code which reflects a set of tests to determine whether a SQL generation engine of the OLAP tool, the OLAP project schema, the data warehouse metadata, and the data warehouse data are valid;

querying the OLAP project schema, utilizing the search code generator code, to return query results;

generating validation code using the query results, the validation code configured to create a validation report by querying the data warehouse metadata and the data warehouse data;

generating a validation report, using the validation code, identifying discrepancies among the SQL generation engine of the OLAP tool, the OLAP project schema, the data warehouse metadata, and the data warehouse data; and outputting the validation report.

7. The computer readable storage of claim 6, wherein the search code generator code is SQL code.

8. The computer readable storage of claim 7, wherein the validation code is SQL code.

9. The computer readable storage of claim 8, wherein the validation code is in the form of a high-level programming language.

10. The computer readable storage of claim 6, further comprising:

interpreting the validation report, using a set of audit rules; and producing data quality statistics and a list of recommended actions.

* * * * *

UNITED STATES PATENT AND TRADEMARK OFFICE
CERTIFICATE OF CORRECTION

| | | |
|---|---|---|
| PATENT NO. | : 7,203,671 B1 | Page 1 of 1 |
| APPLICATION NO. | : 10/770536 | |
| DATED | : April 10, 2007 | |
| INVENTOR(S) | : Craig S. Wong | |

It is certified that error appears in the above-identified patent and that said Letters Patent is hereby corrected as shown below:

Column 15, line 22, "comprising the steps of:" should read --comprising:--.

Signed and Sealed this

Nineteenth Day of June, 2007

JON W. DUDAS
*Director of the United States Patent and Trademark Office*